(12) United States Patent
Kawamura et al.

(10) Patent No.: US 6,252,683 B1
(45) Date of Patent: Jun. 26, 2001

(54) VIDEO PRINTER

(75) Inventors: Takayuki Kawamura, Kadoma; Masami Nakagawa, Hirakata; Tetsuya Hokamura, Osaka; Takashi Koike, Katano, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/933,118

(22) Filed: Sep. 18, 1997

(30) Foreign Application Priority Data

Sep. 18, 1996 (JP) .................................................. 8-245857
Oct. 25, 1996 (JP) .................................................. 8-283614

(51) Int. Cl.[7] .................................................. H04N 1/04
(52) U.S. Cl. .................................................. 358/498; 358/296
(58) Field of Search .................................. 358/498, 401, 358/400, 474, 471, 296; 382/312; 271/145, 3.17, 4.01, 14, 10.02, 10.03, 10.14, 246, 259, 167, 281, 84

(56) References Cited

U.S. PATENT DOCUMENTS

| | | | |
|---|---|---|---|
| 4,915,370 | * | 4/1990 | Himej et al. .......................... 271/145 |
| 5,025,326 | * | 6/1991 | Shimmyo .............................. 358/498 |
| 5,172,903 | * | 12/1992 | Haneda et al. ........................ 271/145 |
| 5,222,722 | * | 6/1993 | Kamano ................................ 271/145 |
| 5,273,271 | * | 12/1993 | Intemann ............................. 271/145 |
| 5,287,164 | * | 2/1994 | Watanabe et al. .................... 271/145 |
| 5,354,044 | * | 10/1994 | Firl et al. ............................. 271/145 |
| 5,379,997 | * | 1/1995 | Ohta .................................... 271/145 |
| 5,441,251 | * | 8/1995 | Ohta .................................... 271/145 |
| 5,586,757 | * | 12/1996 | Nakamatsu et al. ................. 271/145 |
| 5,764,384 | * | 6/1998 | Wilcox et al. ....................... 358/498 |
| 5,956,152 | * | 9/1999 | Yamada et al. ...................... 358/296 |

* cited by examiner

Primary Examiner—Cheukfan Lee
(74) Attorney, Agent, or Firm—Ratner & Prestia

(57) ABSTRACT

A video printing apparatus feeds sheets of printing media from the lower front portion of the apparatus housing and ejects the print media at the upper front portion of the apparatus housing. The apparatus comprises a feed tray to be loaded with printing media, a feeding unit to feed the printing media into the inside of the apparatus, a transport unit to transport the printing media fed by the feeding unit, a switching unit provided between the feeding unit and the transport unit to switch over the transport route of the printing media, at least one detecting unit provided between the switching unit and the transport unit to detect the printing media, a printing unit to transfer printing onto the printing media, an ejection unit to eject the printing media after they have been printed by the printing unit, and an ejection tray to store the printing media ejected by the ejection unit. The feed tray is positioned at an angle with respect to the apparatus housing such that the printing media are at a downward angle in the direction of transport.

9 Claims, 3 Drawing Sheets

VIDEO PRINTER

FIELD OF THE INVENTION

This invention relates to a video printer to make full color thermal transfer printing.

BACKGROUND OF THE INVENTION

In recent years, efforts are being made to realize small size and low cost video printers while pursuing printing of high picture quality and high definition images on special printing paper.

Referring now to drawings, an example of the above described conventional video printers is explained in the following. FIG. 3 is a side cross sectional view of a conventional video printing apparatus. In FIG. 3, the apparatus has a housing 14. A thermal head 1, a platen 2, and an ink sheet 3 constitute a recording unit. A pickup roller 8 which is rotatably arranged, a separating roller 7 which is also rotatably arranged, a reverse roller 16 which can be pressed to the separating roller 7 and can rotate in a reverse direction constitute a paper feed mechanism for sheet form printing paper 12. A printing paper cassette 311 stores the printing paper sheets 12 and can freely slide on a cassette guide 318 of the apparatus housing 14, and can be detached from the apparatus housing 14. The mechanism to transport printing paper sheets once they are fed comprises a lifting member 13 which presses the printing paper sheets to the pickup roller 8, a printing paper pressure plate 10 provided on the printing paper cassette 311 which pushes up the printing paper sheets 12 by means of the lifting member 13 while carrying the printing paper sheets 12, a switching guide 6 to switch over between paper feed and paper ejection, guiding members 15 to guide the printing paper sheets 12, a pinch roller 4 and a capstan roller 5 which drive the printing paper sheets 12 after they have been fed.

The paper ejection unit to eject the printing paper sheets 12 comprises a paper ejecting roller 20 and paper ejecting pinch roller 21. A conventional video printer additionally comprises an ejected-paper tray 309 to store the printing paper sheets 12 after they have been ejected, an ejected-paper tray cover 23 to keep dust off the ejected-paper tray 309, and a first paper detecting unit 17 and a second paper detecting unit 19 to detect the printing paper sheets 12, the first and second printing paper detecting units 17 and 19 consisting of, for instance, photosensors. A control unit 328 to control the video printer comprises electrical circuits and is located underneath the cassette guide 318.

Operation of the above described conventional video printer is explained in the following.

First, in FIG. 3, the printing paper cassette 311 storing a plurality of printing paper sheets 12 is loaded along the cassette guide 318 of the apparatus housing 14. When feeding the printing paper sheets, the lifting member 13 goes up and pushes up the printing paper pressure plate 10 thereby pressing the printing paper sheets 12 on the printing paper pressure plate 10 toward the pickup roller 8 and the first paper detecting unit 17 detects the existence of the printing paper sheets 12; if no printing paper sheet is detected the paper feed action is stopped and "No-Paper" indication is made on an indicator (not shown in the drawing) of the video printer. When a printing paper sheet is detected, the pickup roller 8 rotates and transports a plurality of the printing paper sheets 12.

Now, as the reverse roller 16 which has been detached from the separating roller 7 starts to rotate in the direction opposite to that of the paper feed while pressing the separating roller 7, thereby allowing only one sheet of the printing paper sheets 12 to be transported with the remaining sheets blocked. Guided by the guiding members 15 and the switching guide 6, the transported sheet of the printing papers 12 is forwarded to the second paper detecting unit 19, where the front end of the paper is detected, and the paper feed action is completed after the paper has passed the capstan roller 5 and the pinch roller 4. Subsequently, the printing paper sheet 12 is transported by the pressure and rotation of the capstan roller 5 and the pinch roller 4 and thermal transfer printing is made at the printing unit comprising the thermal head 1, the platen 2, and the ink sheet 3.

Upon detection of the trailing edge of the printing paper sheet 12 by the second paper detecting unit 19, the switching guide 6 turns downward to switch the transport route over toward the paper ejecting unit. After printing by the printing unit is completed, the printed paper sheet is driven by the paper ejecting roller 20 and the paper ejecting pinch roller 21, and ejected to the ejected-paper tray 309 and stored in lamination.

However, in the above described construction, in loading the printing paper cassette with a stack of printing paper sheets into the apparatus housing, high precision guiding members and a loading mechanism (not shown in the drawing) are required to load and securely fit it at a predetermined position, thereby resulting in an increased overall height of the apparatus. To prevent the possibility of improper loading, a printing paper cassette detecting switch (not shown in the drawing) to prevent any damage of the lifting member 13 or its linking mechanical components is also required. Additionally, a cassette locking mechanism (not shown in the drawing) is required to prevent the printing paper cassette from being removed during the printing operation. Thus, the conventional printer had problems of requiring a large number of components, complicated construction and an increased cost. It also required two printing paper detecting units 17 and 19 in between the printing paper cassette and the printing paper transport unit, again causing problems of increased number of components, complicated structure, and increased cost.

SUMMARY OF THE INVENTION

A video printer is constructed such that the printing paper sheets are fed from the lower front portion of the apparatus housing toward the inside of the apparatus and are ejected on the upper front part of the apparatus housing, and comprises a paper feed tray fixed inside the apparatus housing to load the printing paper sheets at a predetermined position, a paper feeding unit to feed the printing paper sheets into the inside of the apparatus, a printing paper transport unit to transport the printing paper sheets after they are fed by the paper feeding unit, a switching unit provided between the paper feeding unit and the paper transport unit to switch over the transport route of the printing paper sheets, at least one paper detecting unit provided between the switching unit and the paper transport unit to detect the printing paper sheets, a printing unit for thermal transfer printing on the printing paper sheets, a paper ejecting unit to eject the printing paper sheets after being printed by means of the printing unit, and an ejected-paper tray to store the printed paper sheets ejected by the paper ejecting unit, and having a paper feed tray positioned on a slant with the front side at a higher position than the rear side so that the printing paper sheets go down on a slant in the direction of paper feeding.

DETAILED DESCRIPTION

Figure 1:
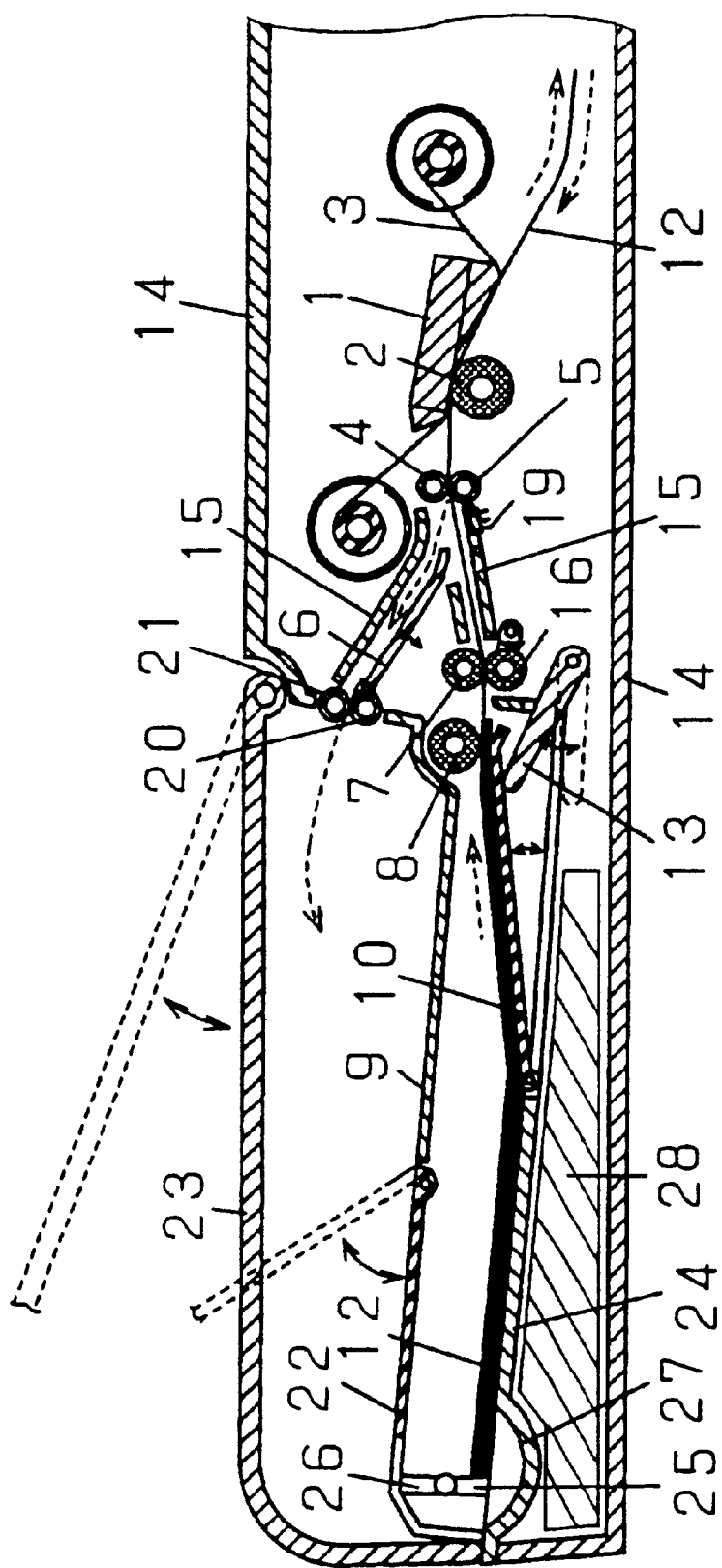
FIG. 1 is a side cross sectional view of a video printer in a preferred embodiment of this invention.

Referring to the drawings, an exemplary embodiment of this invention is explained in the following.

Figure 2:
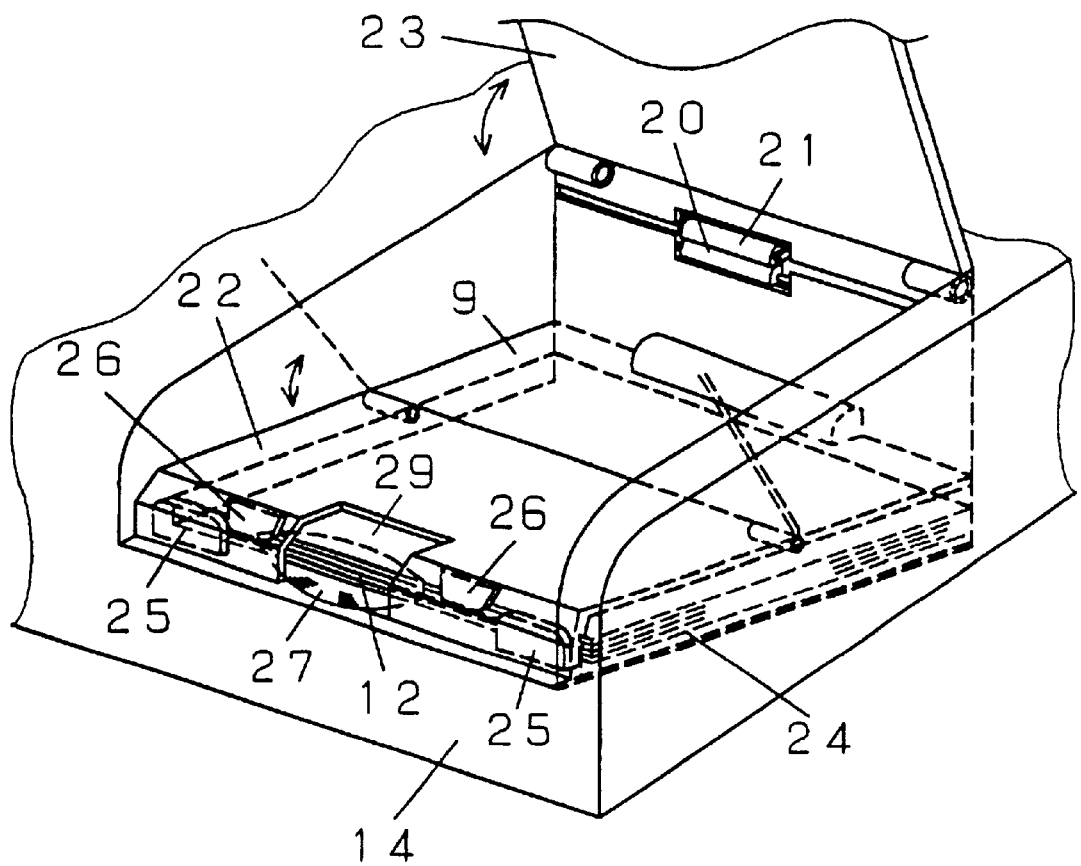
FIG. 2 is a partial perspective view of a video printer in a preferred embodiment of this invention.
Figure 3:
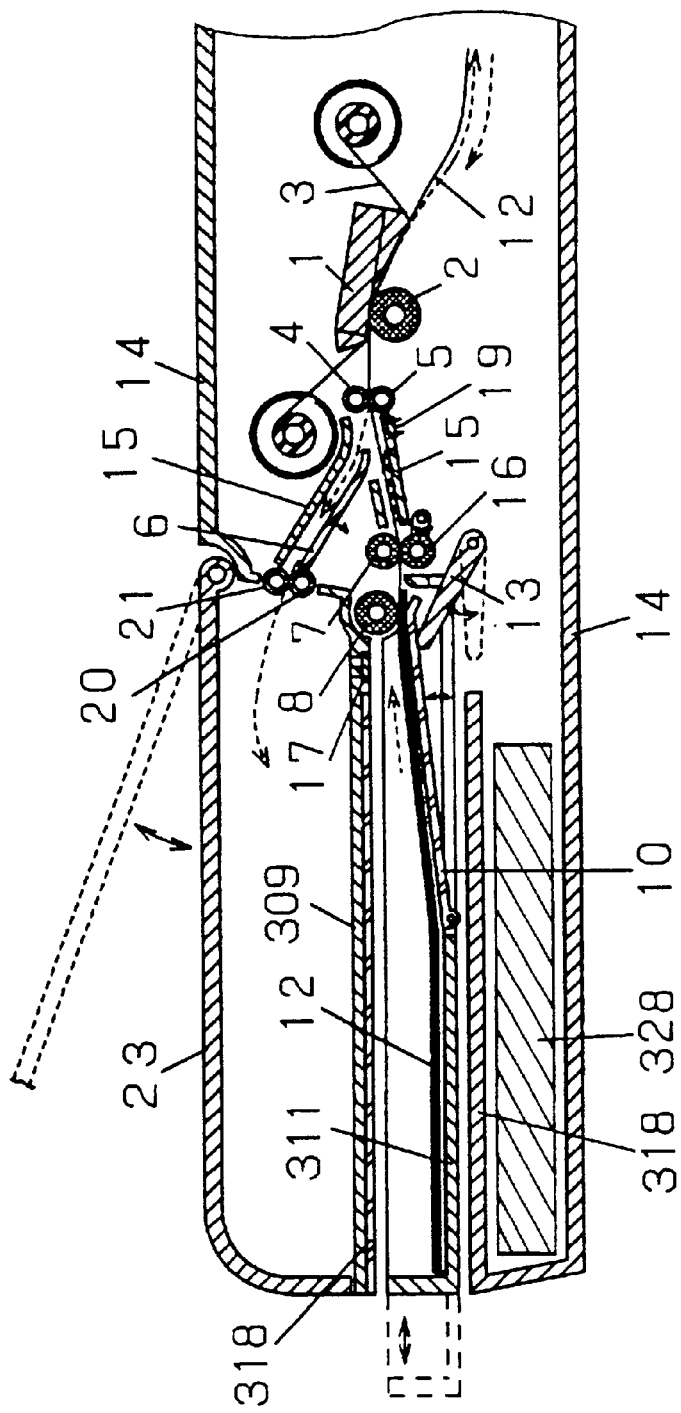
FIG. 3 is a side cross sectional view of a conventional video printer.

In FIGS. 1 and 2, 14 is a housing of the video printer apparatus. A thermal head 1, a platen 2, and an ink sheet 3 make up a recording unit. A paper feeding unit for printing paper sheets 12 comprises a rotatably provided pickup roller 8, a separating roller 7 which is also rotatably provided, and a reverse roller 16 which can be pressed to the separating roller 7 and can rotate in reverse direction. A paper feed tray 24 is fixed to the apparatus housing 14 in such a way that the front portion (left side in FIG. 1) is elevated with respect to the rear portion such that the printing paper sheets 12 are slanted downward in the direction of paper feeding. The paper feed tray 24 is provided with a positioning control member 25 to set the printing paper sheets 12 at a predetermined position relative to the direction of transport. A lifting member 13 presses the printing paper sheets 12 to the pickup roller 8. A printing paper pressure plate 10 provided on the paper feed tray 24 presses the printing paper sheets 12 while carrying them. A switching guide 6 switches between the feeding and ejecting of the printing paper sheets. Guiding members 15 guide the printing paper sheets 12. A pinch roller 4 and a capstan roller 5 to drive the printing paper sheets 12 constitute a printing paper transport unit after the printing paper sheets 12 have been fed. A paper ejection roller 20 and a paper ejection pinch roller 21 to eject the printing paper sheets 12 constitute a paper ejection unit. An ejected-paper tray cover 23 to prevent dust collection on the ejected-paper tray 9 which stores the printing paper sheets 12 after they have been ejected is made preferably of transparent or translucent material so that the inside can be visible. A control unit 28 comprising electrical circuits to control the video printer is so provided as to take advantage of the extra space made available underneath the paper feed tray 24 by slanting it. A paper detecting unit 19 to detect the printing paper sheets 12 typically comprises a photosensor. A paper feed cover 22 is rotatably provided by means of a hinge or the like on the guiding surface underneath the printing paper sheets 12 stored in the ejected-paper tray 9 and near the front side of the apparatus housing 14. The paper feed cover 22 is also provided with a cut portion 29 to make the printing paper sheets visible from the front side of the apparatus. The paper feed cover is further provided with a positioning member 26 to set the printing paper sheets 12 at a predetermined position relative to the direction of transport.

Now, operation of a video printer constructed in accordance with the exemplary embodiment described above is explained in the following. First, open the translucent ejected-paper tray cover 23 followed by opening the paper feed cover 22 by lifting the cut portion 29 with a finger and set a plurality of printing paper sheets 12 in place, namely, inside the positioning control member 25. Existence of the printing paper sheets 12 can be visually confirmed with ease from the front side of the apparatus through the cut portion 29 of the paper feed cover 22 even though the translucent ejected-paper tray cover 23 is closed. As the front middle portion of the printing paper sheets loading area of the paper feed tray 24 has a recessed portion 27, it is easy to take out the printing paper sheets 12 with fingers. After setting the printing paper sheets 12 the paper feed cover 22 is closed and, upon starting the operation of the apparatus, paper feeding is started.

First, the lifting member 13 pivots and presses up the printing paper pressure plate 10 thereby pressing the printing paper sheets 12 to the pickup roller 8. As the pickup roller 8 rotates a plurality of the printing paper sheets 12 are transported, whereupon the reverse roller 16 which has been detached from the separating roller 7 turns to press the separating roller 7 and starts to rotate in a direction opposite to the direction of paper feeding thereby transporting one sheet of the printing paper 12.

Guided by the guiding members 15 and the switching guide 6, the transported sheet of the printing paper sheets 12 is advanced to the printing paper detecting unit 19 where the front end of the printing paper sheet 12 is detected and the paper feeding action is completed at a position past the capstan roller 5 and the pinch roller 4. Subsequently, the printing paper sheet 12 is transported by the pressure and rotation of the capstan roller 5 and the pinch roller 4 and thermal transfer printing is made by the printing unit comprising the thermal head 1, the platen 2, and the ink sheet 3.

In case there is no printing paper sheet 12, the printing paper detecting unit 19 does not detect any paper, and after a certain period of waiting time the operation is stopped and a "No Paper" indication is made on an indicator (not shown in the drawings) of the video printer. On the other hand, on detecting the trailing edge of the printing paper sheet 12 by the printing paper detecting unit 19, the switching guide 6 lowers thus switching the transport route over toward the paper ejection unit; after printing at the printing unit is finished, the printing paper sheet 12 is driven by the paper ejecting roller 20 and the paper ejecting pinch roller 21 and is ejected to the ejected-paper tray 9 and stored in lamination thus completing the operation. Even if printed sheets of the printing paper sheets 12 have been ejected in the ejected-paper tray 9, existence of printing paper sheets 12 in the paper feed tray 24 can be visually confirmed through the cut portion 29 on the front of the paper feed cover 22.

As this invention uses a fixed type paper feed tray as described above rather than a detachable printing paper cassette, there is no need for high precision guiding members for loading the paper cassette into the apparatus housing, or a printing cassette detecting switch to prevent damage of the lifting member or its linking mechanical components, or a cassette locking mechanism to prevent the printing paper cassette from being erroneously removed during printing operation. As a result, fewer components are necessary, and simpler construction and low apparatus cost are realized.

Additionally, as the paper feed tray is slanted with the front portion at a higher position than the rear portion so that the printing paper sheets go down in the direction of feeding, it is easy for a user to supply printing paper sheets and to operate the printer.

Furthermore, since a rotatable cover for supply of printing paper sheets into the paper feed tray is provided on the guiding surface underneath the printing paper sheets in the ejected-paper tray near the front side of the apparatus housing, adhesion of dust on the printing paper sheets is avoided assuring high quality printing, and a larger opening area than that of a paper feed tray having a mere opening makes it easy to supply printing paper sheets thus assuring ease of operation.

Also, as the apparatus is constructed in such a way that the apparatus control unit can be provided to take advantage of the extra space made available by slanting the paper feed tray, the overall height of the apparatus can be reduced providing a more compact video printer.

In addition, on the guiding surface underneath the printing paper sheets in the ejected-paper tray near the front side of the apparatus housing is provided a rotatable paper feed cover to allow supply of printing paper sheets into the paper feed tray, which cover being also provided with a cut portion through which existence of the printing paper sheets can be visually confirmed with ease, thereby making it sufficient to use only one paper detecting unit between the paper feed tray and the printing paper transport unit. Also, the user can easily supply printing paper sheets by opening the paper feed cover with a finger at the cut portion without use of a handle, thus providing a large opening for easy operation and making the cost lower.

Also, with a provision of positioning control members in the paper feed tray and the paper feed cover to set the printing paper sheets at a predetermined position relative to the direction of transport, difficulty in paper feeding such as slippage of paper caused by jumping out of a printing paper sheet from the right position by the reverse rotation of the reverse roller resulting from improper loading or curling of the printing paper sheets can be prevented.

Also, with a provision of a recessed portion in the front middle portion of the printing paper sheets loading area of the paper feed tray, the user can take the printing paper sheets with fingers when replacing the printing paper sheets, making it easy to take out the printing paper sheets and making the operation easy.

Although the video printer in a preferred embodiment of this invention uses a friction retarding system in the paper feeding unit, similar effect can be obtained by using a dissected claw system or a pad system as a matter of course.

While this invention has been disclosed and described with respect to a preferred embodiment thereof, it will be understood by those skilled in the art that various changes and modifications may be made therein without departing from the spirit and scope of the invention as recited in the following claims.

What is claimed is:

1. A video printer apparatus for use with printing media comprising:
   a feed tray to load said printing media at a predetermined position, said feed tray fixedly coupled to an inside portion of said apparatus at a predetermined downward angle relative to the apparatus so that said printing media are provided in a downward feeding direction;
   feeding means to feed said printing media from said feed tray into a portion of the apparatus at said downward feeding direction;
   transport means to transport said printing media from said feeding means;
   switching means disposed between said feeding means and said transport means for switching a path of said printing media from a first path to a second path;
   detecting means disposed between said switching means and said transport means to detect said printing media;
   printing means for printing on said printing media;
   an ejection tray for receiving said printing media after printing, said ejection tray comprising a rotatable cover for supplying said printing media to said feed tray when said cover is in an open position, said cover provided on a guiding surface underneath said printing media after printing near a front portion of said apparatus, and,
   control means for controlling said video printer, wherein said control means is disposed in a space formed below the feed tray, wherein said feed tray is disposed below said ejection tray and in a slanted position downward in a direction toward a rear of the apparatus.

2. A video printer as defined in claim 1, wherein said cover of said ejection tray has a cut portion to allow visual confirmation of said printing media from the front of said apparatus.

3. A video printer as defined in claim 2, wherein a recessed portion is provided on said feed tray at a front middle portion of an area for loading said printing media.

4. A video printer as defined in claim 2, wherein a recessed portion is provided on said feed tray in a front middle portion of an area for loading said printing media.

5. A video printer apparatus for use with printing media comprising:
   a feed tray to load said printing media at a predetermined position;
   feeding means to feed said printing media from said feed tray into an inside portion of the apparatus at a downward feeding direction;
   transport means to transport said printing media from said feeding means;
   switching means disposed between said feeding means and said transport means for switching a path of said printing media from a first path to a second path;
   detecting means disposed between said switching means and said transport means to detect said printing media;
   printing means for printing on said printing media;
   ejection means to eject said printing media printed by said printing means; and
   an ejection tray to store said printing media ejected by said ejection means, said ejection tray having a rotatable paper feed cover for supplying said printing paper sheets to said paper feed tray when said cover is in an open position, wherein said ejection tray is provided on a guiding surface underneath said printing media near a front portion of said apparatus housing.

6. A video printer as defined in claim 5, wherein said cover has a cut portion to allow visual confirmation of said printing media from the front of said apparatus.

7. A video printer as defined claim 6, wherein a recessed portion is provided on said paper feed tray in a front middle portion of an area for loading said printing media.

8. A video printer as defined in claim 6, wherein a recessed portion is provided on said paper feed tray in a front middle portion of an area for loading said printing media.

9. A video printer as defined in claim 8, further comprising control means for controlling said video printer, wherein said control means is disposed in a space formed below said feed tray, wherein said feed tray is disposed below said ejection tray and in a slanted position downward towards a rear of the apparatus.

* * * * *